(12) United States Patent
Socheleau et al.

(10) Patent No.: US 11,319,058 B2
(45) Date of Patent: May 3, 2022

(54) EMA THERMAL MANAGEMENT OPTIMIZATION

(71) Applicant: Goodrich Actuation Systems SAS, Saint-Ouen-l'Aumône (FR)

(72) Inventors: Jerome Socheleau, Vernouillet (FR); Laurent Schwartz, Saint Jean de Beauregard (FR)

(73) Assignee: GOODRICH ACTUATION SYSTEMS SAS, Saint-Ouen l'Aumône (FR)

( * ) Notice: Subject to any disclaimer, the term of this patent is extended or adjusted under 35 U.S.C. 154(b) by 644 days.

(21) Appl. No.: 16/221,900

(22) Filed: Dec. 17, 2018

(65) Prior Publication Data
US 2019/0270511 A1    Sep. 5, 2019

(30) Foreign Application Priority Data
Mar. 1, 2018 (EP) .................................... 18305222

(51) Int. Cl.
*B64C 13/50* (2006.01)
*H02K 9/22* (2006.01)

(52) U.S. Cl.
CPC .............. *B64C 13/50* (2013.01); *H02K 9/22* (2013.01); *B64D 2221/00* (2013.01)

(58) Field of Classification Search
CPC ......... B64C 13/14; B64C 13/16; B64C 13/18; B64C 13/34; B64C 13/50; B64C 13/24; F15B 21/02
See application file for complete search history.

(56) References Cited

U.S. PATENT DOCUMENTS

| 7,007,897 | B2 | 3/2006 | Wingett et al. |
| 9,016,633 | B2 | 4/2015 | Asfia et al. |
| 2002/0018716 | A1* | 2/2002 | Kennedy ............... B64C 27/001 416/25 |
| 2007/0018040 | A1* | 1/2007 | Wingett .................. B64C 13/42 244/99.4 |
| 2009/0108129 | A1 | 4/2009 | Flatt |

FOREIGN PATENT DOCUMENTS

| EP | 1721825 A1 | 11/2006 |
| WO | 2016172029 A1 | 10/2016 |

OTHER PUBLICATIONS

Extended European Search Report for International Application No. 18305222.4 dated Sep. 19, 2018, 5 pages.

* cited by examiner

*Primary Examiner* — Joshua J Michener
*Assistant Examiner* — Colin Zohoori
(74) *Attorney, Agent, or Firm* — Cantor Colburn LLP

(57) ABSTRACT

A system for controlling an electromechanical actuator of an aircraft includes a locking device configured to mechanically lock said actuator in a first fixed position and to mechanically unlock said actuator from said first fixed position and a controller configured to be in bi-directional communication with both said locking device and said actuator. The controller is configured to monitor a position of said actuator during flight and to detect when said actuator has not moved for a set amount of time, said controller further being configured to instruct said locking device to lock said actuator in said first, locked position when said set time has been reached. In addition, there is provided a method for controlling the thermal properties of an electromechanical actuator of an aircraft.

13 Claims, 5 Drawing Sheets

EMA THERMAL MANAGEMENT OPTIMIZATION

FOREIGN PRIORITY

This application claims priority to European Patent Application No. 18305222.4 filed on Mar. 1, 2018, the entire contents of which is incorporated herein by reference.

TECHNICAL FIELD

The subject matter disclosed herein relates to the thermal management optimization of electromechanical actuators (EMAs). In particular, the present disclosure concerns the thermal management optimization of electromechanical actuators that may be used for aerospace applications, such as to control components in an aircraft including flight control surfaces as well as other applications.

BACKGROUND

For currently known EMAs within an aircraft, the conventional manner for holding a static or permanent aerodynamic load is to apply an opposite mechanical torque developed by the motor, drawing a current from the aircraft electrical power network. Due to the Joule effect, however, this current being drawn generates heat that must then be dissipated outside the motor and its power drive electronics to avoid any overheat and damage. The successful use of EMAs for holding a permanent load therefore requires effective solutions for actuator cooling.

The current methods for the thermal management of EMAs for such aerospace applications are based on heat sink natural convective cooling in ambient air. In particular, the cooling of the electrical motor and power drive electronics is achieved via the use of heat sinks that are sized so as to allow for the dissipation of the heat produced inside the components when the unit is subjected to these external loads. Unfortunately, however, the use of such heat dissipation means adversely affects the size of the EMAs and the size of the power drive electronics. For example, current EMAs that may be used for primary flight control in an aircraft are often significantly bigger than their equivalent electrohydraulic servo actuators (EHSAs). This means that their installation in thin wing envelopes may prove to be a significant challenge and may even not be possible due to the volume of their electrical motors and power drive electronics. The presence of large heat sinks means increased weight. This is disadvantageous in an aircraft wherein weight should be preferably kept as low as possible to get a high pay load. Several challenges must also be taken into account when designing convective cooling for such EMAs, for example the suitable ventilation of the actuator environment and the size of the heat sink, etc. must be considered. The present disclosure therefore aims to deal with these problems.

BRIEF SUMMARY

A system for controlling an electromechanical actuator of an aircraft, the system comprising the electromechanical actuator; a locking device configured to mechanically lock the actuator in a first fixed position and to mechanically unlock the actuator from the first fixed position; and a controller configured to be in bi-directional communication with both the locking device and the actuator; wherein: the controller is configured to monitor a position of the actuator during flight and to detect when the actuator has not moved for a set amount of time, the controller further being configured to instruct the locking device to lock the actuator in the first, locked position when the set time has been reached.

The controller may further be configured to send a command to the locking device to unlock the actuator from the first position.

In some examples of the systems and methods described herein the electromechanical actuator may comprise an anti-extension device.

In some examples of the systems and methods described herein the electromechanical actuator may comprise comprises a power off brake.

In some examples the electromechanical actuator may be a spoiler of an aircraft and the first, locked position may be a retracted position.

In any of the examples described herein the system may comprise power drive electronics and may have software embedded in the power drive electronics; the software may be configured to provide the control of the mechanical locking device.

A method for controlling the thermal properties of an electromechanical actuator of an aircraft is also described herein, the method comprising providing an electromechanical actuator and a locking device that is configured to mechanically lock the actuator in a first fixed position and to mechanically unlock the actuator from the first fixed position; and providing a controller that is in bi-directional communication with both the locking device and the actuator; the method further comprising: monitoring, via the controller, a position of the actuator during flight and detecting when the actuator has not moved for a set amount of time, and sending a first command from the controller to the locking device to lock the actuator in the first, locked position when the set time has been reached.

The method may further comprise sending a second command from the controller to the locking device to unlock the actuator from the first position.

In some of the examples described herein the electromechanical actuator may be a spoiler of an aircraft and the first, locked position may be a retracted position.

BRIEF DESCRIPTION OF THE DRAWINGS

The subject matter is particularly pointed out and distinctly claimed in the claims at the conclusion of the specification. The foregoing and other features and advantages of the embodiments are apparent from the following detailed description taken in conjunction with the accompanying drawings in which like elements are numbered alike in the FIGURES:

DETAILED DESCRIPTION

A new type of system and method for optimizing the thermal management of EMAs that may be used in an aerospace application is described herein. The examples described herein are aimed not only at being able to sufficiently dissipate heat, but also in providing EMA systems that may be manufactured that are lighter, having a smaller and more compact size than current, known EMAs. As described below, this may be achieved by the examples described herein due to their optimized management of the EMA.

Some known EMA designs for use in aerospace applications (e.g. mainly spoilers and sometimes ailerons) include mechanical locking devices such as an anti-extension device (AE device) or power off brake device (which in effect is also a type of anti-extension device) which are engaged as a fail-safe mechanism in case of system failure.

Figure 1:
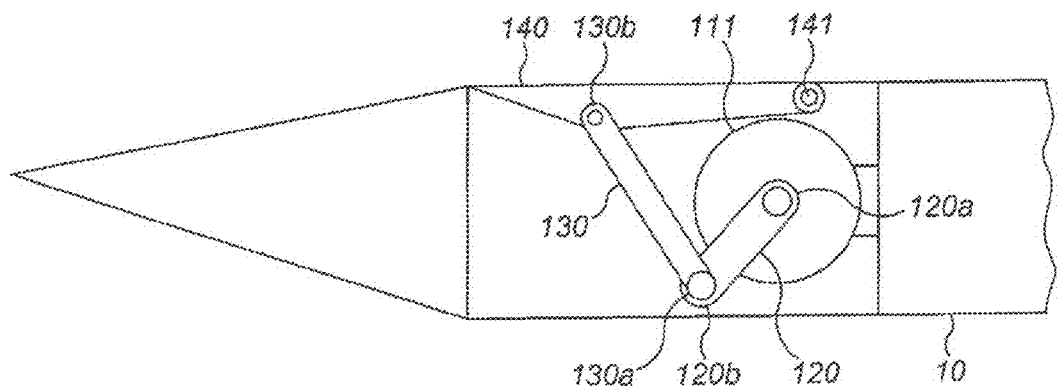
FIG. 1 depicts a rotary spoiler of an aircraft wing with the actuator in the retracted position.

An example of a known EMA is shown in FIG. 1. In detail, FIG. 1 depicts an example of a rotary spoiler of an aircraft wing 10 having an anti-extension device as a mechanical locking device. The same concepts, however, also apply to an aileron as well as a spoiler. In this figure, the actuator is in the retracted position. The actuator has means 111, 120, 130 for moving the flight control surface 140. In this example, the means for moving the surface 140 comprises an actuator body 111 attached or fixed to the aircraft wing 10. The actuator further comprises an output lever 120 that is connected at its first end 120a to the actuator body 111 and extends therefrom to its second end 120b. A connecting rod 130 is also connected to this second end 120b of the output lever 120, as shown in FIG. 1. The connecting rod 130 may also be connected at a first end 130a to the second end 120b of the output lever 120 and connected to a flight control surface 140 at its second end 130b. The flight control surface 140 may also comprise a surface hinge 141.

Figure 2:
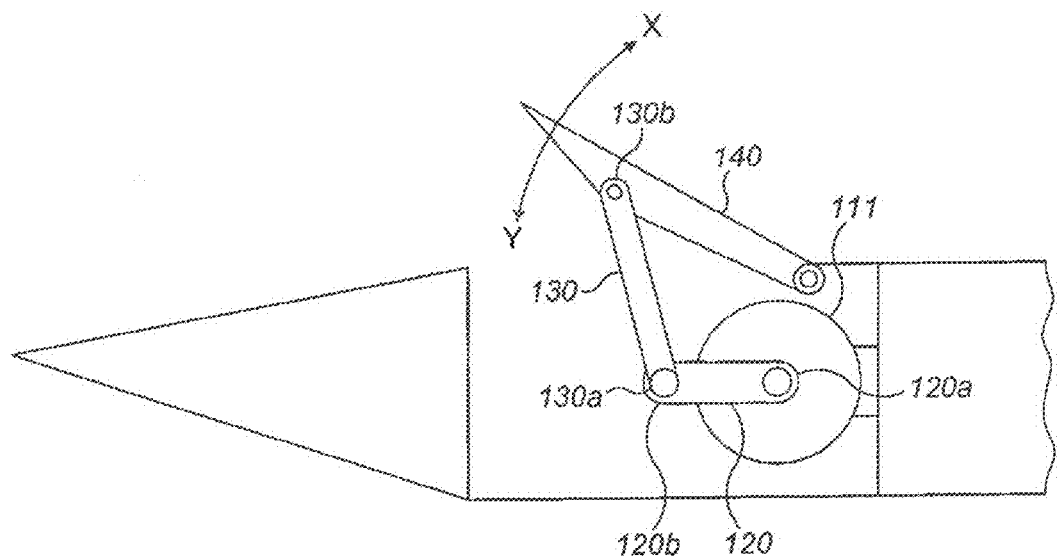
FIG. 2 depicts the surface movement driven by the spoiler with the actuator at an intermediate position.
Figure 4:
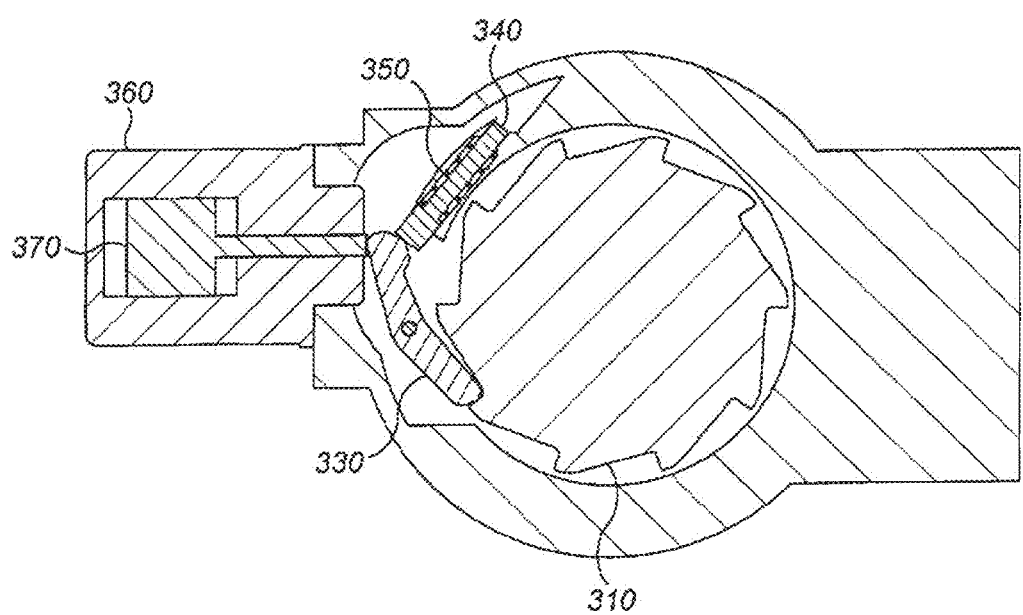
FIG. 4 depicts the anti-extension device in anti-extension mode.

FIG. 2 depicts the surface 140 movement of FIG. 1 when being driven by the spoiler, wherein the actuator is in an intermediate position. The direction X in FIG. 2 depicts the extension direction and the direction Y depicts the retraction direction. FIG. 4 depicts the internal features of the anti-extension device in anti-extension mode. The primary function of the anti-extension device in normal use is, in the situation of failure of the actuator, power supply or controller, to enable the retraction of the actuator (i.e. the direction Y in FIG. 2) under aerodynamic load and prevent any extension motion of the actuator (i.e. prevent movement in the direction X, as shown in FIG. 2).

Figure 3:
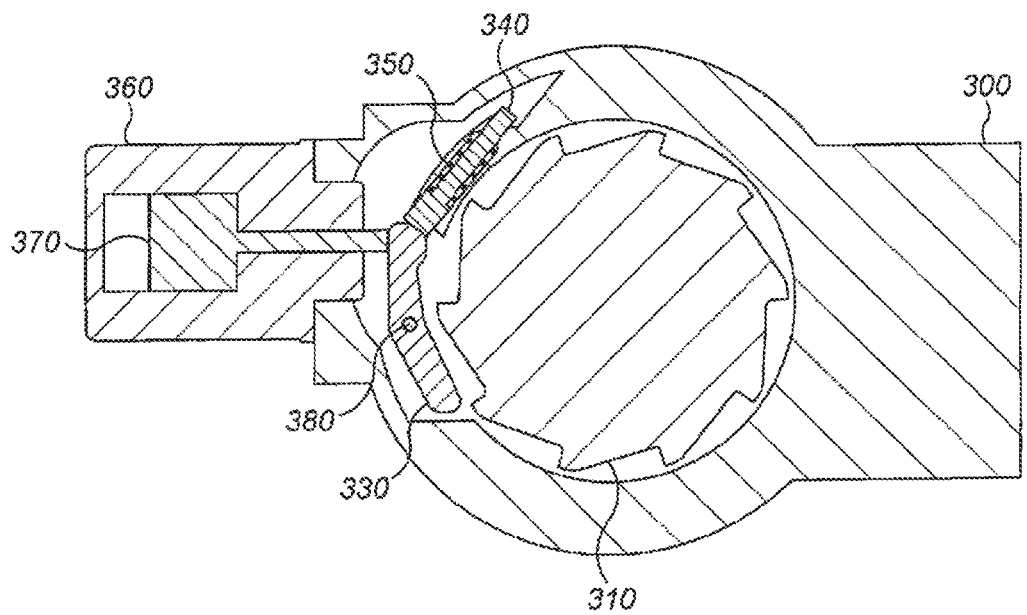
FIG. 3 depicts the anti-extension device in operating mode.

FIG. 3 depicts an example of a known design to achieve this anti-extension function and shows the various internal components of the anti-extension device when the actuator is in operating mode. In detail, the actuator may comprise a housing 300 fixed to the aircraft structure 10, a ratchet wheel 310 fixed to an actuator drive train (not shown), a pawl 330 rotating around an axle 380 that is fixed on the actuator housing 300, a pawl pusher 340 to guide a pawl spring 350. The pawl spring 350 pushes the pawl 330 against the ratchet wheel 310 and a solenoid 360 (having a solenoid core/plunger 370) are provided to inhibit the anti-extension device.

In a normal operating mode, the solenoid 360 is supplied with power and the pawl 330 is then disengaged, as shown in FIG. 3. The actuator drive train is therefore free to move in both directions according to the motor torque. When electric power is lost, however, for example, in the case of a power failure, the solenoid 360 is no longer powered and the actuator switches into the anti-extension mode. In this anti-extension mode the solenoid 360 is electrically disengaged, the pawl spring 350 pushes the pawl 330 against the ratchet wheel and the spring pushes back the solenoid plunger 370, see FIG. 4 (which shows the anti-extension mode). Due to this, the drive train is able to move counter-clockwise in the retraction direction and is unable to move clockwise in the extension direction. As a result, the actuator is blocked between a retraction end-stop and the locked ratchet wheel 310, as shown in FIG. 1, which depicts the actuator in the retracted position.

Figure 5:
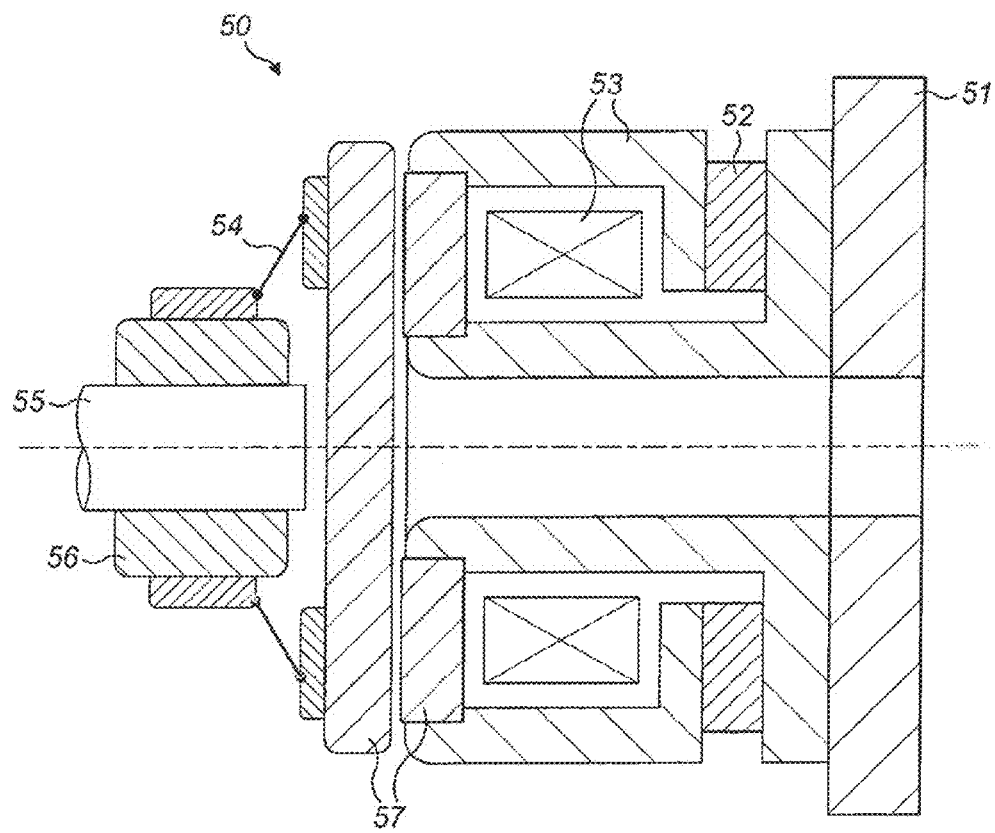
FIG. 5 depicts a power off friction brake with a permanent magnet.
Figure 6:
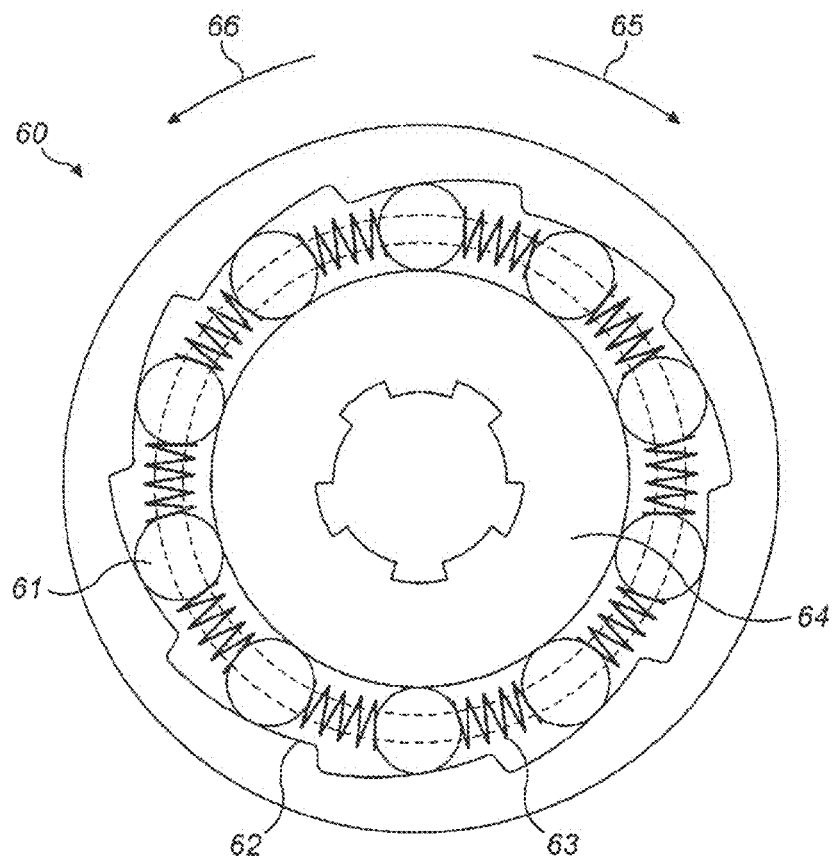
FIG. 6 depicts a free wheel mechanism that is inserted between the shaft and the hub of the power off brake of FIG. 5.

FIG. 5 depicts a power off brake device 50, such as are also known in the art. These may be coupled to the free wheel 60 as shown in FIG. 6 to result in another type of anti-extension device. FIG. 5 depicts the body 51 of the power off brake device 50, which comprises a permanent magnet 52 which is associated with a field/coil 53. The power off brake device 50 also has a spring loaded armature 54, a shaft 55 extending through the armature 54 and a hub 56. Friction plates 57 are also provided.

FIG. 6 depicts a free wheel mechanism 60 as is known in the art that can be inserted between the shaft 55 and the hub 56 of the power off brake 50. As is known in the art, the free wheel mechanism 60 may comprise rollers 61, a concertina shaped spring 62, a cage 63 and an inner member 64 that is fixed/fixable to a casing (not shown). The direction 65 indicates the locked, or fixed position of the external ring, whereas the direction 66 indicates the unlocked, or free moving position of the external ring.

When power is lost and the coil 53 is not energized, the friction plates 57 are in contact and the hub 56 is then connected to the body. This therefore locks the movement of the free wheel mechanism 60. In contrast, when the coil 53 is energized, the friction plates 57 are disconnected and so the hub 56 is free to move so that the free wheel mechanism 60 is no longer locked.

In the same way as described above, this power off brake works as a fail-safe mechanism for locking any movement of the free wheel mechanism 60 when power is lost.

As mentioned earlier, such anti-extension devices are known in the art. The new and improved system described herein with reference to FIG. 7, however, is to optimize the thermal management of aircraft electromechanical actuators by taking advantage of these existing anti-extension devices at specific points in time during the flight of an aircraft.

As mentioned above, in the field of aircraft, the conventional manner for holding a static or permanent aerodynamic load is to apply an opposite mechanical torque developed by the motor, drawing a current from the aircraft electrical power network. Due to the Joule effect, however, this current generates heat that must then be dissipated outside the motor and its power drive electronics to avoid any overheat and damage.

It has been realized by the applicant, however, when analyzing a typical duty cycle of a spoiler actuator, for example, that the actuator is not moving very often and instead stays in a steady state position (i.e. with no motion), whereas it does react to a permanent traction load. Such actuators in spoilers may often only be used for approximately ten percent of a typical flight duration. Therefore, in known systems, the mechanical torque of the motor would be generating heat to hold the actuator in position for approximately 90 percent of the flight duration. The new system described herein therefore takes advantage of this and instead uses a mechanical locking device or means to engage the actuator in position when the actuator is normally not moving anyway. This therefore nulls the heat generated in the motor solenoid and in the power electronics. In turn, this allows for a significant downsizing in their respective heat sinks.

An example of a locking device that can be used is an anti-extension device such as those normally provided in aircraft and described above. Other mechanical locking devices may also be used, however and the anti-extension devices and power off brake devices described above are referred to herein only as examples. These anti-extension devices are normally used in a fail-safe mode (i.e. they are configured to naturally engage and lock the actuator into position upon loss of power). These devices are, however, also capable of being engaged when power is available.

The new systems described herein therefore take advantage of these features of the known anti-extension device(s) such as those described with reference to FIGS. 3 to 6 to mechanically lock the actuator in place at the points in time when the actuator is not moving. For example, when the actuator is in a normal operating mode and the actuator is not moving, the controller of the system described herein reacts to this and mechanically locks the actuator in place instead of using an opposite mechanical torque from a motor. In other words, the new systems described herein react mechanically to the load applied on the flight control surface. This therefore leads to dramatic reduction in the overall power that needs to be consumed in the motor, in the locking device and in the power drive electronics during a flight and therefore results in there being less heat to dissipate.

Examples of typical situations where the system may do this may be during cruise flight, when the actuator is in the retracted position for approximately 90 percent of the flight duration. For example, a spoiler may normally be in the retracted position during this time. Another example is during a steady state position, for example, an aileron may be in a steady state position for the majority of flight duration while also being subjected to a permanent traction load.

Another example may be when the aircraft flight control computer has not sent a displacement command for a specific amount of time (as in the example shown in FIG. 1) and so the actuator is determined not to be moving for a set period of time.

In such situations, the actuator power drive electronics are instructed by the system described herein to switch to the anti-extension mode so that the solenoid is deactivated, thereby causing the actuator to lock in its previous position (FIG. 4), and, as mentioned above, in contrast to known systems, the motor does not need to hold the aerodynamic load.

As a result, the torque motor does not need to draw any current or power from the aircraft electrical network whilst the actuator is mechanically locked via an anti-extension device. The main benefit of this is that the heat to be dissipated outside the solenoid, the motor and its electronics is significantly reduced and so the associated heat sink can be significantly downsized.

The system that provides this effect will therefore now be described in greater detail.

Figure 7:
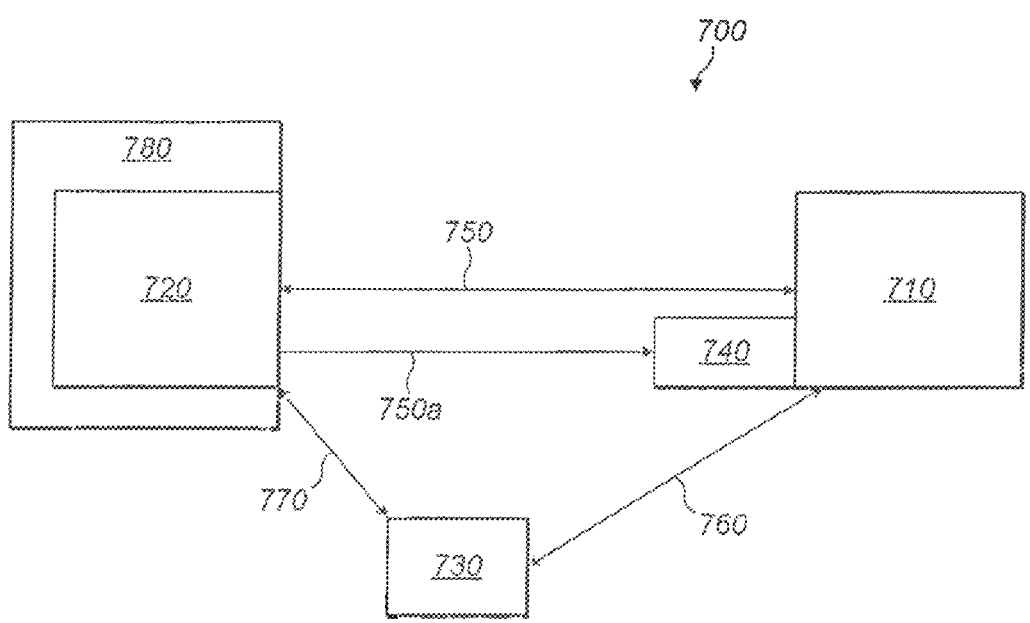
FIG. 7 is a schematic view of a new system for controlling an electromechanical actuator.

The system 700 for optimizing the thermal management of an electromechanical actuator 710 is shown schematically in FIG. 7.

The system comprises a flight control computer 780 that comprises a controller 720, a flight deck control (accessible by the pilot) 730, both of which are capable of sending and receiving information (via communication channels 750, 760) to and from the electromechanical actuator(s) 710. The flight deck control 730 can also communicate bi-directionally with the controller 720 of the flight control computer 780 via communication channel 770. The system 700 also comprises an anti-extension device 740 which is associated with the electromechanical actuator 710 so as to mechanically lock the actuator 710 in position upon receipt of an instruction from the controller 720.

The controller 720 of the flight control computer 780 of the new system described herein is configured to monitor the movement of the actuator 710 during flight, detect when the actuator 710 has stopped moving for a set period of time, and based upon that detection, provide instructions to the anti-extension device 740 (via communication channel 750*a*) to mechanically lock the actuator in position.

The controller 720 of the flight control computer 780 can also detect when the actuator 710 should be moved again and can therefore provide instructions to the anti-extension device 740 to mechanically unlock the position of the actuator 710. That is, the flight control computer is configured to send, via communication means 750*a*, a first signal to the anti-extension device 740 that commands it to physically and mechanically lock the actuator in a set position. The controller 720 is also able to send a second actuator command code to the anti-extension device 740 to instruct it to unlock the position of the actuator 710.

When the position of the actuator 710 has been monitored and detected to be held in the same position for a set amount of time (e.g. more than 1 minute or 5 minutes) the controller 720 sends a signal to the anti-extension device 740 to physically and mechanically lock the actuator 710 into a first locked position. Due to this, the load is maintained without any torque needing to be provided by the motor.

In some examples, this decision process and method to manage the anti-extension mode may be handled by a software/algorithm embedded in the power drive electronics of the controller 720.

This new example of a method of optimizing the thermal management of an EMA is able to provide an innovative way of performing thermal management in that it is able to relieve the motor from the cruise holding load by using an existing anti-extension device to react to the aerodynamic effort. The use of the existing anti-extension device to react to the aerodynamic loads instead of the motor thereby results in less heat being dissipated in the motor and its associated power drive electronics.

Although the main examples given here have been directed to a rotary spoiler or an aileron, the system described herein can also be used for other actuating components of an aircraft, including flight control actuators, or a rotary or linear EMA fitted with an anti-extension device. In fact, such a system can be used to optimize the thermal management of any electromechanical actuator on an aircraft. For example, this system can be used also for the thermal management/optimization of aircraft controls, steering wheel, thrust reverser, secondary flight controls, braking etc.

The examples described herein provide significant advantages over known EMAs in that they allow for a significant reduction in size of the motor and power electronic heat sink. They also result in a reduced motor and power electronics internal temperature and provide a reduction in the amount of electrical power that is consumed by an aircraft network. Due to the actuator experiencing lower losses, aircraft global efficiency is improved. The examples described herein also result in an increase in the reliability of the electronic parts since they are under less thermal stress. Since the solenoid and power off brake devices are power consuming devices, the thermal management described herein also save energy for these devices.

The invention claimed is:

1. An electromechanical actuator system of a control surface of an aircraft comprising:
    an electromechanical actuator;
    a locking device configured to mechanically lock said actuator in a first fixed position and to mechanically unlock said actuator from said first fixed position; and
    a controller configured to be in bi-directional communication with both said locking device and said actuator;
    wherein said controller is configured to monitor a position of said actuator during flight and to detect when said actuator has not moved for a set amount of time; and
    wherein said controller is also configured to instruct said locking device to lock said actuator in said first, locked position when said set time has been reached.

2. The system of claim 1, wherein said controller is configured to send a command to said locking device to unlock said actuator from said first position.

3. The system of claim 1, wherein said electromechanical actuator includes an anti-extension device.

4. The system of claim 3, wherein:
    said electromechanical actuator is a spoiler of an aircraft; and
    said first, locked position is a retracted position.

5. The system of claim 1, wherein said electromechanical actuator comprises a power off brake.

6. The system of claim 1, further comprising power drive electronics and having software embedded in the power drive electronics;
    said software being configured to provide said control of said mechanical locking device.

7. A method for controlling the thermal properties of an electromechanical actuator of a control surface of an aircraft, the method comprising:
    providing said electromechanical actuator and a locking device that is configured to mechanically lock said actuator in a first fixed position and to mechanically unlock said actuator from said first fixed position; and
    providing a controller that is in bi-directional communication with both said locking device and said actuator;
    monitoring, via said controller, a position of said actuator during flight and detecting when said actuator has not moved for a set amount of time, and sending a first command from said controller to said locking device to lock said actuator in said first, locked position when said set time has been reached.

8. The method of claim 7, further comprising:
    sending a second command from said controller to said locking device to unlock said actuator from said first position.

9. The method of claim 7, wherein said electromechanical actuator includes an anti-extension device.

10. The method of claim 7, wherein said electromechanical actuator comprises a power off brake.

11. The method of claim 9, wherein said electromechanical actuator comprises a power off brake.

12. The method of claim 9, wherein said electromechanical actuator is a spoiler of an aircraft and said first, locked position is a retracted position.

13. The method of claim 10, wherein said electromechanical actuator is a spoiler of an aircraft and said first, locked position is a retracted position.

* * * * *